(12) United States Patent
Fabre

(10) Patent No.: US 9,315,749 B2
(45) Date of Patent: Apr. 19, 2016

(54) LIQUID FUEL COMPOSITION WITH ALCOHOLS OF FOUR CARBON ATOMS AND ADDITIVES, WITH IGNITION BY COMPRESSION

(76) Inventor: Jose Antonio Fabre, Curitiba (BR)

( * ) Notice: Subject to any disclaimer, the term of this patent is extended or adjusted under 35 U.S.C. 154(b) by 177 days.

(21) Appl. No.: 13/816,364

(22) PCT Filed: Aug. 11, 2011

(86) PCT No.: PCT/BR2011/000284
§ 371 (c)(1),
(2), (4) Date: Feb. 11, 2013

(87) PCT Pub. No.: WO2012/061909
PCT Pub. Date: May 18, 2012

(65) Prior Publication Data
US 2013/0139430 A1    Jun. 6, 2013

(30) Foreign Application Priority Data

Nov. 12, 2010  (BR) .................................... 1004630

(51) Int. Cl.
| | |
|---|---|
| C10L 1/19 | (2006.01) |
| C10L 1/23 | (2006.01) |
| C10L 1/02 | (2006.01) |
| C10L 1/14 | (2006.01) |
| C10L 10/00 | (2006.01) |
| C10L 1/18 | (2006.01) |
| C10L 1/188 | (2006.01) |
| C10L 1/198 | (2006.01) |
| C10L 1/222 | (2006.01) |
| C10L 1/233 | (2006.01) |

(52) U.S. Cl.
CPC ................ *C10L 1/231* (2013.01); *C10L 1/026* (2013.01); *C10L 1/14* (2013.01); *C10L 1/143* (2013.01); *C10L 1/1811* (2013.01); *C10L 1/19* (2013.01); *C10L 10/00* (2013.01); *C10G 2300/1014* (2013.01); *C10G 2400/04* (2013.01); *C10L 1/1881* (2013.01); *C10L 1/1883* (2013.01); *C10L 1/1985* (2013.01); *C10L 1/222* (2013.01); *C10L 1/2225* (2013.01); *C10L 1/2227* (2013.01); *C10L 1/2335* (2013.01); *C10L 2270/026* (2013.01); *Y02E 50/13* (2013.01); *Y02P 30/20* (2015.11)

(58) Field of Classification Search
USPC ........... 44/322, 349, 385, 388, 412, 414, 417, 44/423
See application file for complete search history.

(56) References Cited

U.S. PATENT DOCUMENTS

| | | | |
|---|---|---|---|
| 2,378,466 A | 6/1945 | Crume | |
| 4,368,056 A | 1/1983 | Pierce et al. | |
| 4,541,835 A | 9/1985 | Norton et al. | |
| 4,541,837 A * | 9/1985 | Norton et al. | 44/326 |
| 4,668,245 A * | 5/1987 | Schieler | 44/413 |
| 2005/0160662 A1* | 7/2005 | Jordan | 44/329 |
| 2007/0130822 A1* | 6/2007 | Araya | 44/446 |
| 2009/0151232 A1 | 6/2009 | Hashimoto et al. | |
| 2009/0277079 A1 | 11/2009 | Baustian | |
| 2009/0307965 A1* | 12/2009 | Vilardo | 44/385 |
| 2012/0237988 A1* | 9/2012 | Anthony et al. | 435/135 |

FOREIGN PATENT DOCUMENTS

| | | | |
|---|---|---|---|
| CN | 101245267 A | | 8/2008 |
| EP | 0030429 | * | 6/1981 |
| EP | 0716139 A1 | | 6/1996 |
| GB | 2090612 A | | 7/1982 |
| JP | 2006037064 A | | 2/2006 |
| JP | 2008260819 A | | 10/2008 |
| KR | 20020009543 A | | 2/2002 |
| KR | 20030006529 A | | 1/2003 |
| WO | 9324593 A1 | | 12/1993 |
| WO | 2010115578 A2 | | 10/2010 |
| WO | 2011001285 A1 | | 1/2011 |

OTHER PUBLICATIONS

PCT/BR2011/000284, PCT International Search Report, Sep. 8, 2011.
Affidavit of Anthony John Stiff, named co-inventor of EP 0030429, EP Registry, Submission of Sep. 3, 1983 (20 pages).

* cited by examiner

*Primary Examiner* — Prem C Singh
*Assistant Examiner* — Chantel Graham
(74) *Attorney, Agent, or Firm* — Brian J. Pangrle

(57) ABSTRACT

A liquid fuel composition includes alcohols of four carbon atoms and additives, the liquid fuel composition being for ignition by compression. Various examples pertain to a liquid fuel composition with alcohols of four carbon atoms and additives, with ignition by compression to a diesel cycle fuel engine where the fuel can be able to be produced by means of biotechnology from renewable biologic source, including processes of fermentation of sugars or materials available on sugar and ethanol plants. As an example, a produced fuel can be used conventionally as replacement of diesel in urban transportation vehicles or roads and can be an alternative to diesel fuel. The composition can be employed alone or mixed to fossil diesel oil (e.g., in the engine, etc.).

15 Claims, No Drawings

LIQUID FUEL COMPOSITION WITH ALCOHOLS OF FOUR CARBON ATOMS AND ADDITIVES, WITH IGNITION BY COMPRESSION

RELATED APPLICATION

This application is a 35 U.S.C. §371 National Stage of PCT/BR2011/000284 filed Aug. 11, 2011 (published as WO2012/061909 A1 on May 18, 2012), which claims priority to BR PI1004630-5, filed Nov. 12, 2010, which claims priority to a BR national document number 015100003010 having a filing or deposit date of Aug. 13, 2010. All of the foregoing applications and publications thereof are incorporated herein by reference.

SUMMARY

Technologies described herein are related to liquid energy sources, ignitable by compression, aiming at providing a diesel cycle fuel that can be produced from renewable biologic sources by means of biotechnology, including processes of fermentation of sugars or materials available on sugar and ethanol plants. Thus, a produced fuel may be used conventionally as a replacement for diesel in urban transportation vehicles or roads and may be an alternative to diesel used on sugar and ethanol plants, which may reduce the emission of fossil carbon in the sugar and alcohol production, with advantages of fossil sources replacement, reduction of emission of carbon compounds, proper consumption, compatible cost, life cycle maintenance of system compounds, greater safety and reduced evaporation loss.

Internal combustion engines with compression ignition (diesel cycle engine) are known from the pioneering work of Rudolph Diesel, which demonstrated the possibility and adequacy of thermal machines in which the fuel ignition occurs by heating of air-fuel mixture, caused only by the compression of the mixture in the combustion chamber, without the need of using a spark generated by an electric system, as in spark ignition engine (Otto cycle engine).

Diesel cycle engines are in general 30% more efficient at converting thermal energy to mechanical energy than Otto cycle engines with the same power. For this reason, trucks, buses, civil construction machines, agricultural machinery, power generators, irrigation motor pumps, vehicles etc. are powered by diesel engines. Modern diesel engines, used mainly in cars, have low emission of harmful gases. When compared to Otto engines of equivalent power, they have a reduced emission of carbon dioxide, just because of the greater efficiency of energy conversion. However, the great majority of diesel engines use diesel fuel (of fossil origin) that contributes to greenhouse effect and have emission of harmful products and pollutants, mainly particulate matter, nitrogen oxides and sulfur derivatives.

Nowadays there is a clear trend towards the development of fuels from biological sources (biofuels) that have a production cycle in which at least half of carbon issued during the biofuel burning is recovered by the biological growing process, in general by capturing atmospheric carbon in the photosynthesis process. Production cycles, however, add carbon in many steps of the biofuels manufacturing process, particularly by the fueling of agricultural machines, trucks and irrigation motor pumps. The production cycle of ethanol from sugarcane, for instance, is one of most efficient in capturing carbon, but uses diesel fuel intensively. One of the objectives described herein is to provide a fuel for a diesel cycle that can be produced by biotechnological methods, including processes of fermentation of sugars or materials available in sugar and ethanol plants. Thus, such a fuel can be an alternative to diesel fuel employed at sugar and ethanol plants, reducing the fossil carbon emission in the production cycle of sugar and alcohol.

BACKGROUND

Among the biofuels, the most widely used is ethanol, in spark ignition engines (Otto cycle), as a compound mixed into gasoline or as relatively pure fuel. Ethanol has a high octane rating, that is, proper antiknock characteristics to spark ignition. Thus, it is possible to confer proper octane rating to gasoline, replacing tetraethyl lead, a toxic compound. When used in mixture with gasoline, ethanol is anhydrous, as presence of water can prevent formation of a stable mixture with gasoline. When used without any other mixture in Otto cycle engines, ethanol is hydrated. Ethanol is used in many countries mixed with gasoline, reaching in Europe and United States rates up to 85% in volume of ethanol in ethanol/gasoline blends (E85). In Brazil, pure hydrated alcohol is widely used.

However, ethanol has some disadvantages.

Ethanol contains low calorific power comparing to gasoline. On average, the energy content of hydrated ethanol is only 70% of energetic content of gasoline with 22% ethanol (blend supplied to Brazilian market).

Hydrated Ethanol has a higher corrosion rate when compared to gasoline.

Technologies allowing the use of ethanol or alcohol in compression ignition engines (diesel cycle) include blends and emulsions of ethanol and/or other alcohol in diesel fuel or oil fractions. Often such mixtures or emulsions use butanol or isobutanol as a co-solvent, an auxiliary with a polar character intermediate between ethanol and hydrocarbons, so as to increase the stability of mixture.

Mixtures tested and taken to market presently exhibit stability problems, as ethanol and diesel are poorly miscible. Many present a phase separation some time after mixture, such separation being aggravated by environmental conditions such as low temperatures, air humidity, etc. Surface degradation problems such as cavitation and corrosion occur frequently, due to physical separation between the compounds caused by the friction efforts and dynamic pressure differences found in the pumping system and fuel injection. Further, such mixtures still do not represent a completely renewable fuel, because use fossil fuels in large proportion.

Another current technology involves the mixture to hydrous ethanol of additives capable of increasing the ethanol explosivity, in order to allow its ignition by compression.

2-EHN and organic peroxides are conventionally used to increase diesel fuel explosivity, however, they are not used as additive to ethanol, because their added content versus increase in the cetane number curve tends to be asymptotic after 8% in volume of additive content, but does not reach the cetane number of about 42, which may be considered a requirement for a proper ignition of diesel fuel or hydrated ethanol.

All nitrates present stability problems (acidic or alkaline hydrolysis), especially in presence of water. Hydrated ethanol, by its water content, shows a tendency to hydrolyze, generating free acid which increases with storage period, leading to increased nozzle corrosion (e.g., for injector nozzles). Even in nitrate-free media, durability is reduced by the presence of steam in injector nozzle and exhaust valves. For this reason, the maintenance of systems for hydrated ethanol have a reduced time when compared to diesel systems. For example, the maintenance manual for Scania's ethanol-fueled buses for BEST Project indicates changing injector nozzles every 22,000 km, while the nozzle change in diesel systems occurs every 120,000 km.

Besides the durability problems related to hydrated ethanol, due to great difference of calorific power of ethanol related to diesel, there is an increase in the consumption measured as L/h of ethanol/L/h of diesel ratio between 1.5 and 2.0. This greater consumption, combined with cost of additives, tends to make economically impracticable ethanol projects, which are very important from an environmental point of view.

Another technology for ethanol employment on vehicle engines and equipment conventionally operating in diesel cycle consists on "ottolization", that is, transformation of engines originally working in diesel cycle to run on the Otto cycle, by adaptation of a spark plug in a cylinder head of diesel engine. Such conversion, besides resulting in cost and time to be performed, being difficult to reverse, implies in consumption flow increases L/h ethanol L/h diesel above 2.0 once Otto cycle has an energy conversion efficiency about 30% lower than the diesel cycle of equivalent power.

Through searches performed on Brazilian and international patents databases, various patents were found, including those listed below.

Chinese patent with publication number CN 1016029686 and CN101434875 discloses options of hydrocarbons with ethanol.

Patent CN 101580743 discloses a diesel fuel or gasoline compound of fuel materials mixture, tar and solvents derivate from industrial or organic wastes, 10-50% of butanol, isopropanol, d-terc-butyl-p-cresol or their mixtures, 10-25% dienering iron, or kerosene, solvent oil, mineral oil, lubricating oil, vegetable oil or mixtures thereof. This patent does not employ substantially butanol as main fuel.

Patent CN 101402887 is a compound substantially composed of ethanol (75 to 90%) to act as diesel at low temperatures, containing, among other compounds, 2 to 10% butanol or isobutanol. Basically, butanol acts as co-solvent for several compounds.

Patent CN 101376848 describes an ethanol-diesel mixture with proportion between 60-85% of diesel. Butanol is used in the content between 0.5 and 1.5% as co-solvent to aid in the stability of resulting emulsion.

The American patent US 2009013591 show a fuel mixture including 15-95% of gasoline or diesel, from 5 to 85% of alcohol, among them butanol, characterized by the ethers use of glycerol as additive.

Chinese patent CN 101235325 reveals a diesel-methanol mixture, being diesel 23-50%, methanol 35-70% where two among various other components are isobutanol 0-3% and butanol 0-3%.

Chinese patent CN 101215483 presents a diesel-methanol mixture comprising between other compounds, 0.25-0.6% of terc-butanol.

Patent CN 1800313 reveals a gasoline emulsion with alcohols and dimethyl ether that may have 2-3% of 2-butanol.

Patent CN 1730619 presents a fuel emulsion that contains methanol, oil, diesel, terc-butanol, fatty acid ester of sorbic alcohol, polyoxyethylene and monomethyl polyethylene.

Patent CN 1796513 describes an additive to diesel comprising ethanol, ketones, silicones, n-butanol and benzyl alcohols.

Patent CN 1769398 presents a fuel with 65-80% methanol, which may contain, among others, 5-10% butanol.

Patent CN 1590515 describes a fuel formed by the diesel mixture, benzene, gasoline, butanol and ammonium salt of fatty acid.

Patent EP 0403516 presents a polyalkylene glycols additive to hydrated ethanol in the ration between 12-20%, however the examples show proper results in polyalkylene glycols contents exceeding 17% for conventional engines with typical compression ratio of 18:1.

U.S. Pat. No. 5,628,805 describes ethoxylated polyol to be added to hydrated ethanol in the ration between 5 and 10% v/v. Currently, this technology is being used in Stockholm (Sweden), and it is being tested in several cities of the world, applied in Scania engines, by means of the project BEST (BioEthanol for Sustainable Transportation). But to be used in the ration of 5%, it is required an engine specially projected for fuel, with a compression rate higher than that used in conventional diesel engines. While the conventional diesel engines compression rate is about 17:1, the Scania diesel engines compression rate dedicated to ethanol is about 24:1. This limits its use to dedicated engines, and prevents that the "flexfluel" technology is used, that is, neither fuel thus formulated could be used in a large base of existing conventional engines, or ethanol-dedicated engines could be used with proper diesel to conventional compression rates (oil, biodiesel, vegetable oil etc.).

U.S. Pat. No. 2,378,466 presents organic nitrates use such as ethyl nitrate, ethylene glycol dinitrate (EGDN), triethylene glycol dinitrate (TEGDN), tetraethylene glycol dinitrate (TetraEGDN), as additives capable of increasing the diesel ignition.

Recently, options of ethanol alternatives emerged from renewable sources. Among the options, 4-carbons alcohols, mainly n-butanol and isobutanol can be produced by renewable biotechnology process, with advantages such as a slightly lower calorific value than gasoline, higher solubility in hydrocarbons, lower corrosiveness, higher boiling and flash points, which makes handling and storage of the fuel safer and reduce evaporation losses. The conventional process for butanol production by microbiological fermentation is the process ABE (Acetone-Butanol-Ethanol), which uses sugars fermentation by the bacterium *Clostridium acetobutylicum*. Introduced in the early XX century by the industrial chemist, Zionist movement leader and first president of the State of Israel Chaim Weizmann, the process has its focus on the acetone production being used in large scale to obtainment of Cordite explosive (double based powder). Subsequently, the process was supplanted in terms of economic feasibility by the petrochemical process and fill into disuse.

A development line currently employed is the genetic modification of *Clostridium* genus that increases the ABE process productivity and selectivity to expand the butanol production. Such development line includes as n-butanol production processes, patents U.S. Pat. No. 5,753,474, US 2010143996, US 2010136641, CA 2699378, WO 2010024715, WO 2010024714, GB 2462642, WO 2010017230, US 2010036174, RU 2375451, CN 101595218, WO 2009149270, KR 2010019127, US 2010086982, WO 2009142541, GB 2459756, CN 101423815, CN 101250496, and JP 60172289.

The Canadian patent CA 2548221 reveals a new bacterium, *Clostridium carboxidivorans*, which can synthesize biofuels from CO, including ethanol and catalyze the acetate and butanol production. It also can directly ferment lignocellulose to produce ethanol or other substances.

Patents US 2009275787 and WO 2010031793 use modified *Clostridium* bacteria to produce n-butanol from glycerin. This process is of commercial interest, because great volumes of glycerin are obtained in the fatty acids transesterification (biodiesel production), and there is not demand to the planned volume of glycerin that must enter in the Brazilian market due to increased biodiesel content on diesel.

Patent US 2010093020 uses bacterium *Enterococcus* genus genetically modified for optimized production of butanol.

Patent WO 2009122192 uses in the butanol production, genetic bacteria modification of Bacillaceae family, preferably *Geobacillus* or *Ureibacillus*.

Patent WO 2009082690 uses genetic code modification of many bacteria for butanol production.

Patents US 2010143985, US 2010129885, US 2010062505, WO 2009140159, WO 2009013159 present, for butanol production, a genetically modified yeast. The advantage of yeast is to use them normally for ethanol production, making easier the process adjustment for existing sugar and alcohol plants.

Canadian Patent CA 2691998 employs the bacterium or yeast genetically modified for butanol production.

Patent WO 2009105733 provides a photosynthetic process using plants, algae and blue-green algae that may produce butanol directly from $CO_2$ and water. Thus, there is the direct carbon sequestration from atmosphere, with better energy use of the process, and competition reduction between the biofuels production process and food production.

Patent KR 20090025221 shows a process using algae to generate biomass, thus transforming it into alcohols or ketones, including butanol.

Patent WO 200900346 provides a process converting $CO_2$ into gases, and which subsequently uses the fermentation of such gases to obtain products, including butanol.

Patents WO 2009103533, CA 2684860, WO 2009086423, and WO 2010037111 provide modifications on yeasts for isobutanol production.

Patent WO 2009149240 provides a production process for isobutanol from the biomass fermentation by bacteria species *Escherichia coli*.

The following patents provide non-specified modified cells for butanol and ethanol production: WO 2009013160, US 2009176288, WO 2009082148, WO 2008124523, WO 2009059254, and WO 2008143704.

Patent WO 2009078973 presents genetic modifications on microorganisms for production of many value products, including butanol, from free fatty acids.

Patent CN 101358187 foresees gamma radiation to modify cells or protoplasts to increase the butanol yield.

Many processes apply conventional microorganisms of fermentation processes without genetic modification; however, with optimization of industrial process yield for obtaining butanol, or butanol from the fermentation broth, which increases yield, because the same low butanol contents make the fermentation media toxic for microorganisms producing alcohol.

Patents that disclose process changes: NL 10355651, KR 100556322, WO 2010011769, CN 201367402, US 2008274524, WO 2010000649, US 2010105115, WO 2009106835, WO 2009112335, WO 2009100434, CN 101475932, US 2009162912, WO 2009087680, WO 2009079362, CN 101418320, CN 101397236, CN 101429527, WO 2009062601, US 2009017514, CN 101363031, WO 2009021503, CN 101333545, WO 2009008616, WO 2008154301, CN 101302545, CN 101250561, WO 2008124490, CN 101333545, CN101457238, DE 102006060610 and WO 2009079213.

Patent CN 101165188 presents the butanol production from ground manioc or manioc starch.

Patent US 2010087687 presents a process for vegetable biomass, animal or municipal wastes exploitation, which includes butanol among the products.

Patent MX 2009006782 presents a process to produce biofuel, which includes biobutanol from enzymes.

Patent WO 2009128644 presents a metabolic network model for metabolic characteristics analysis of microorganisms producing butanol, and methods to select or change microorganisms to obtain high efficiency metabolic products.

Patents US 2010058654, JP 2009220105, WO 2009097312, KR 20090009330, JP 2008088140, and RU 2191769 present catalysts for processes that can convert ethanol produced from renewable sources in butanol.

Although it is desirable that the butanol become an economically feasible fuel produced from renewable and biological sources (so called biobutanol), there are other patented solutions for petrochemical processes to obtain butanol: patent US 2010048960 provides a process for producing butanol from butane.

Patent US 2009239275 presents a process to produce 2-butanol by petrochemical means.

Patent WO 2005108593 provides an enzymatic catalyst for production of 2-butanol from 2-butanone.

Patent KR 20080106516 describes a process for butanol production from butene.

Patent MX 2009008416 presents a production process of many alcohols, including n-butanol and isobutanol.

Below some patents are listed that describe fuels that use butanol as part of their compositions.

Patent US 2010005709 shows an ethanol mixture, isopropanol and sec- or terc-butanol, no more than 3% methanol and no more than 15% C5 or larger. The obtainment process is a petrochemical process Fischer-Tropsch type (obtaining alkanes from carbon monoxide and hydrogen), and the mixture is used as fuel to Otto cycle engines fuel (gasoline).

Patent US 2009277079 shows a mixture to be used with isomers butanol gasoline with good cold ignition.

Patent WO 2009120042 presents a process to chemically produce butyl butyrate from butyric acid and butanol from fermentation. Ester can be used as biodiesel.

Patent WO 2009114752 shows a process to use xenobiotic materials that are carbon sources, to produce biomass and/or biogas from microorganisms degrade carbon sources, and then using microorganisms to synthesize biofuels. One of biofuels cited is butanol.

Patent WO 2009106647 shows an engine with compression ignition comprising two injection systems, where one system injects diesel or biodiesel, and the other injects a fuel more volatile than diesel, such as hydrogen, LPG (Liquefied Petroleum Gas), natural gas, ethanol, propanol or butanol. Such biofuels hybrid system have been recently showed to the market by many companies, always with a using ration between two fuels next to 50%/50% with some disadvantages: requirement of two fuel tanks, separated transportation/supply logistic for two fuels, from a injection sophisticated control system variable as required power load, and the purchase by the user of injection system modification kit.

Patent US 2009151232 discloses a diesel composition having between 9 and 20% of butanol, 0.4% to 4% of nitrate or butyl nitrite, and the remaining base for light diesel, or uses a substantial amount (between 90.6 and 76%) of diesel derived from oil.

Patent CN 101402888 offers an additive compound and a diesel fuel of methanol containing, among other, 1 to 10% n-butanol. N-butanol acts as co-solvent, but the fuel is substantially composed of methanol, which has a low calorific power and is extremely toxic.

Patent KR 20090003146 shows a mixture to replace gasoline (Otto cycle engines), composed mainly of ethanol or methanol, containing among other, 5 to 8% of butanol.

Patent CN 101240199 shows a mixture of alcohol-ether (65-70%), where the alcohol is a mixture of methanol, butanol and acetone, and ether is a mixture of any two ethers including dimethyl ether, isopropyl ether or methyl terc-butyl ether (MTBE).

Patent US 2010005709 shows a process to produce alternative fuels, including obtaining synthesis gas from renewable sources, convert this gas into olefins with chain substantially between C2 and C4, and hydrolyze these olefins. The resulting mixture of alcohols has butanol, and should be mixed into gasoline.

Patent MX 2007010015 shows an alcohols mixture from C1 to C5 or C1 to C8, with more ethanol than methanol, with octane rating higher than ethanol, which could replace gasoline.

Patent CN 101085938 reveals a synthetic biological fuel with 10-50% of fuel derived from oil, such as naphtha, dimethyl ether and gasoline, 4.5-10% of one or more list that includes ether, acetone or butanol.

Patent CN 1884440 deals with the production of fatty acid ester (biodiesel) terc-butyl using terc-butanol as the transesterification reagent.

Patent JP 2004285346 comprises an alternative fuel to gasoline, ethanol compound, and at least two compounds from the group consisting of diisopropyl ether, methyl terc-butyl ether, ethyl terc-butyl ether, dipropyl ether, tert-butanol, dibutyl ether and diethyl ether.

Patent KR 20040044677 describes an alternative fuel composed of 50-80% of mixed liquid extract of coal extracted from bituminous coal, 10-20% of ethanol or methanol from coal liquefaction, 5-15% of n-butanol extracted from coal liquefaction, and 5-10% and 5-10% toluene extracted from the liquefaction of coal.

Patent KR 20020009543 presents alcohol-based fuels to replace gasoline compound, among others, 5-15% butanol.

Patent KR 20030006529 describes a fuel to internal combustion engines, Otto cycle, compound, among others, 3-7% butanol.

Patent RU 2148075 presents based fuel compositions, containing 0.0065-0-0.0075% of "oligoetilhidreto" siloxane and 0.0025-0.0035% by weight of butanol.

Patent WO 9324593 discloses a diesel fuel, containing between 10 and 35% of ethanol in diesel mixture, also containing butanol and alkyl peroxide.

Patent KR 930011071 describes an emulsion fuel of 1000 parts of oil (gasoline?), 15-70 parts of siloxane or "oxosilano", 100-300 parts of butanol, 3-7 parts of methanol, 10-20 parts of polyethylene glycol and 1-3 parts of non-ionic surfactant.

Patent JP 2022388 provides a fuel in alcohol emulsion form (methanol, ethanol, or butanol), benzene, toluene or xylene, and an aromatic rich fraction from the catalytic cracking fluid of oil refinery.

European patent EP 0171440 describes a fuel for engine basically based in a hydrocarbons compound, which additionally contains alcohols and optionally ethers, ketones, aromatics, additives and lead compounds that may contain 0-10% butanol.

Patent CA 1221539 describes a stable composition of gasoline and ethanol, containing an additional alcohol, that may be, among others, n-butanol and isobutanol.

U.S. Pat. No. 4,526,586 describes microemulsions from vegetable oil, a C1-C3 alcohol, water and 1-butanol as non-ionic surfactant.

Patent GB 2090612 describes a mixture for use of diesel comprising between 10 and 60% in gas oil, 10-60% of a C1-C8 alkyl ester, C12-22 fatty acid and 10-50% of a mixture which contains at least n-butanol and acetone.

U.S. Pat. No. 4,398,920 deals with a fuel a mixture containing: (a) gasoline, gas oil, or fuel oil, (b) a mixture of butanol and acetone, optionally containing isopropanol and/or ethanol; and (c) methanol, where the mixture butanol/acetone (b) is prepared by proper organisms fermentation such as bacteria or fungi.

U.S. Pat. No. 4,368,056 describes a fuel formed by mixing butanol obtained from fermentation and glycerides obtained from a fermentation process where the substrates are industrial wastes such as cheese yeast, corn cobs, wood chips etc.

U.S. Pat. No. 4,300,912 describes a synthetic fuel consisting of macromolecules of long chain formed by connection by methanol distillation, butanol and kerosene oil with colloidal stabilizer.

DETAILED DESCRIPTION

Of the foregoing patents pertaining to fuels that employ butanol as part of a composition, described is the use of isomeric alcohols of butanol as fuel for Otto cycle engines, i.e., suitable for spark ignition, or mixtures motor fuel cycle diesel that will eventually have their butanol or alcohol isomers, but not described is alcohol and butanol isomer use as main fuels.

Butanol, isobutanol or other isomer alcohol of 4 carbons, by itself, does not have similar characteristics to diesel, which are required to work properly in diesel cycle engines, as described below.

Butanol and its isomers have high octane rating, that is, resistance to detonation by compression, this feature is desirable in fuels for Otto cycle engines, however this is opposite to desirable characteristics of fuels for diesel engine cycle. In contrast, diesel fuels should have a high cetane number, that is, greater explosiveness when initiated by compression. Specifications of diesel used in Brazil require a number of cetanes equal or higher than 42, in accordance with standards ASTM D 613 (measurement in single-cylinder engine CFR type) or ASTM D 6890 (measurement of ignition delay in combustion chamber of constant volume IQT type). Low cetanes number result in engine cold start difficulty, or even in the non-ignition of fuel under compression, with total engine stop and accumulation of unburned liquid fuel inside the engine cylinder.

Butanol and isomers, despite of showing similar viscosity to diesel, do not have comparable lubricity to diesel, mainly those types of diesel with high sulfur content. The low lubricity wear the injection system, specially injection pumps rotors "common rail" type, where pressures and friction efforts are very large, exhaust valves lock, causing premature wear and rings fluttering, that is, a number of deleterious effects on components of injection systems and on the engines. In accordance with Brazilian standards, diesel should present a maximum wear of 460 µm in a lubricity test FRR (High Frequency Reciprocating Rig), according to standard ASTM D 6079.

Alcohols, although butanol and isomers shows a less corrosive aggression compared to hydrated ethanol, presenting larger materials corrosion when compared to diesel, generating wear problems to materials of injection system.

Butanol alcohols isomers undergo on oxidation by oxygen in the air during its storage, generating butryc acid, which have an extremely unpleasant odor that can be solved by adding an antioxidant additive.

As described in various examples herein, a liquid fuel composition can include alcohol(s) of four atoms of carbon and additives where the liquid fuel composition is suitable for ignition by compression. One object of the technology developed and described herein was to provide an alternative of energy supply for engines ignited by compression from renewable biological source with advantages of replacing fossil fuels, reduction in the emission of carbon compounds, proper consumption, compatible cost, maintaining the life cycle of system compounds, greater safety and reduced evaporation losses. A fuel described herein may replace diesel, is based on substantial proportion of 4 carbons alcohol, such as n-butanol, isobutanol, sec-butanol and terc-butanol and is an alternative available from renewable sources, produced in sugar and alcohol plants, and may remove a fossil fuel using a great amount in the production cycle of sugar and ethanol, in irrigation engine pumps, tractors, sugarcane transportation trucks, sugarcane harvesters and support trucks. Other interesting applications may be with urban buses fuel, because the environmental laws in many Brazilian states and municipalities include ambitious targets for reducing the use of fossil fuels.

To arrive at various optimized formulations for a fuel composition, exhaustive searches were conducted and possible mixtures were subject to practical tests, carried out using the formulated fuels which are presented in tables I and II, with a description of the tests that prove the suitability of a fuel such as described further below:

Test I: Number of cetane number (DCN) in equipment IQT (Ignition Quality Tester) of AET (Advanced Engine Technology), according to standard ASTM D6890;

Test II: The cold start engine and point adjustment: the test consisted on establishing if the engine starts after a maximum of 10 turns of crankshaft. If the start occurs, the result is noted "OK", otherwise is noted "does not occur".

Test III: Diameter of wear scar in steel ball for evaluating lubricity in equipment HFRR (High Frequency Reciprocating Rig), according to standard ASTM D 6079;

Text IV: Corrosion test of the injector nozzle: the injector nozzle is the item of greatest susceptibility to corrosion and premature wear in injection systems of diesel engines. This test consists of dipping an injector nozzle of multiple holes Bosch model DLLA 134 P 422, produced in steel DIN 18CrNi8, on the fuel under test, kept in over at 75° C. during two weeks.

Test V: The free acidity mixture after 2 weeks at 75° C.: the free acidity of fuel mixture was measured by the method ASTM D 974 "Standard Test Method for Acid and Base Number by Color-Indicator Titration", immediately before and after the injector nozzle exposure to fuel for 2 weeks at 75° C., as Test IV above.

Test VI: Test in engine and electric dynamometer Positron/Eatron, model 8121, maximum power 500 CV, maximum rotation 5000 rpm: the test consisted on obtainment of power curve x rotation in Mercedes-Benz engine model OM 352A, turbocharged with turbine Lacombe to 5 points.

Test VII: Average consumption test: during the dynamometer test, the average consumption is measured to each rotation, once adjusted the dynamometer curve to the fuel in test have the same power than diesel in the same rotation. The consumption was measured by the fuel mass consumed in a time period of 5 minutes, by the difference of fuel mass in a plastic drum on a scale.

Test VIII: durability test of injector plastic drum: the testes consisted on pumping the testing fuel by means of a rotating VE type Bosch injector pump, model 0-460-424-369 in closed circuit, using the pump nominal flow, by a total of 1,000 h, at room temperature. After test of 1,000 h, the pump is disassembled, its compound being assessed for wear.

Tests were conducted and compared to diesel, and the hydrated ethanol to select the content rates optimized in efficiency to tested additives.

TABLE I

Results of ignition efficiency tests:

| Test number | Composition 5 v/v | DCN, IQT | Cold start test and point adjustment |
|---|---|---|---|
| 1 | Metropolitan diesel | 44 | Start OK, nominal point of diesel |
| 2 | n-butanol | Ignition failure by the equipment. | — |
| 3 | n-butanol 98% Triethylene Glycol Dinitrate (TEGDN) 2% | 31.72 | The start did not happen easily, point with advancement of 12° related to diesel point. |
| 4 | n-butanol 97.6% TEGDN 2.4% | 34.81 | Start Ok, point with advancement of 14° related to diesel point. |
| 5 | n-butanol 97% TEGDN 3.0% | 36.4 | Start Ok, point with advancement of 14° related to diesel point. |
| 6 | n-butanol 98% Tetraethylene Glycol Dinitrate (TetraEGDN) 2% | 32 | The start did not happen easily, point with advancement of 12° related to diesel point. |
| 7 | n-butanol 97.5% TetraEGDN 2.5% | 36 | Start Ok, point with advancement of 14° related to diesel point. |
| 8 | n-butanol 94% isopropyl nitrate (IPN) 6% | 16 | — |

TABLE I-continued

Results of ignition efficiency tests:

| Test number | Composition 5 v/v | DCN, IQT | Cold start test and point adjustment |
|---|---|---|---|
| 9 | n-butanol 95.1%<br>isopropyl nitrate (IPN) 4.9% | 17.62 | — |
| 10 | n-butanol 94.4%<br>nitrate of 2-ethyl hexanol (2-EHN) 5.434%<br>lubricant Ultrazol 9525 0.135% | 22 | — |
| 11 | n-butanol 90.72%<br>2-EHN 9.1495%<br>lubricant Ultrazol 9525 0.135% | 29.31 | — |
| 12 | n-butanol 88.85%<br>2-EHN 11.01%<br>lubricant Ultrazol 9525 0.13% | 34 | Start Ok, point with advancement of 16° related to diesel point. |
| 13 | n-butanol 94%<br>ethoxylated glycerin with an average of 10 ethylene oxide units per unit glycerol (10 Glycereth EO) 6% | 35 | Start Ok, point with advancement of 16° related to diesel point. |
| 14 | n-butanol 97%<br>nitrate of ethoxylated glycerin with an average of 10 molar units of ethylene oxide per glycerin molar unit (nitrate of glycereth 10 EO) 3%.<br>DCN (IQT) cold start engine | 34 | Start Ok, point with advancement of 16° related to diesel point. |
| 15 | n-butanol 85%<br>methyl ester of palm oil (palm methylic biodiesel, BMP) 15% | 21 | — |
| 16 | n-butanol 75%<br>BMP 25% | 32 | Start Ok, point with advancement of 16° related to diesel point. |
| 17 | Isobutanol 97.6% v/v<br>TEGDN 2.4% v/v | 32 | Start Ok, point with advancement of 16° related to diesel point. |
| 18 | 97.393% isobutanol<br>2.482% TEGDN<br>0.125% lubricant Ultrazol 9525 A of Lubrizol | 32.61 | Start Ok, point with advancement of 14° related to diesel point. |
| 19 | isobutanol 97.6% v/v<br>TetraEGDN 2.4% | 35 | Start Ok, point with advancement of 14° related to diesel point. |
| 20 | isobutanol 89% v/v<br>2-EHN 11% | 35 | Start Ok, point with advancement of 14° related to diesel point. |

TABLE II

Lubricity corrosion, dynamometric curve and durability tests results.

| # | Composition (v/v) | Diameter HFRR, μm | Injector nozzle corrosiveness | Power curve × rotation | Free total acidity before and after exposure at 75° C. mg KOH/g | Average consumption L/h | Pump durability 1,000 h |
|---|---|---|---|---|---|---|---|
| 1 | Metropolitan diesel | 400 | No change | RPM-CV<br>1200-52<br>1500-95<br>1800-132<br>2000-40 | | RPM-L/h<br>1000-13<br>1300-17<br>1500-19.5<br>1800-23 | non wear noticed |

TABLE II-continued

Lubricity corrosion, dynamometric curve and durability tests results.

| # | Composition (v/v) | Diameter HFRR, μm | Injector nozzle corrosiveness | Power curve × rotation | Free total acidity before and after exposure at 75° C. mg KOH/g | Average consumption L/h | Pump durability 1,000 h |
|---|---|---|---|---|---|---|---|
| 2 | Hydrated ethanol | 844 | Generalized corrosion, rust presence in all nozzle. | — | 0.016 before 0.156 after | — | — |
| 3 | n-butanol | 822 | Light corrosion, indicated by some rust points. | | 0.012 before 0.07 after | | — |
| 4 | 2.505% TEGDN, 0.106% lubricant Ultrazol 9525A of Lubrizol and 97,389% n-butanol | 644 | Without corrosion signals, but the mixture was slightly yellowish | — | 0.013 before 0.081 after | | — |
| 5 | 2.502% TEGDN, 0.106% lubricant Kerokorr LA 99C of BASF 0.102% anti-corrosive Keropur MFlex 3651 of BASF, 97.29% and n-butanol | 473 | No corrosion signals, clear mixture | RPM-CV 1200-50 1500-96 1800-134 2000-36 | 0.011 before 0.06 after | RPM-L/h 1000-15 1300-19.4 1500-23 1800-26 | non wear noticed |
| 6 | 2.494% TEGDN, 0.094% friction modifier Kerocom 3561 of BASF, 0.041% anti corrosive Kerokorr 3232 of BASF, 97.371% n-butanol | 501 | | | | | |
| 7 | 2.51% TEGDN, 0.102% lubricant Kerokorr LA 99C of BASF, 0.061% anti corrosive Kerokorr 3232 of BASF 97.327% isobutanol | 467 | | | | | |
| 8 | 2.506% TEGDN 0.212% lubricant Kerokorr LA 99C of BASF 0.1121% anti-corrosive Keropur MFlex 3651 of | 398 | No corrosion signals, clear mixture | | before 0.012 after 0.010 | | |

TABLE II-continued

Lubricity corrosion, dynamometric curve and durability tests results.

| # | Composition (v/v) | Diameter HFRR, μm | Injector nozzle corrosiveness | Power curve × rotation | Free total acidity before and after exposure at 75° C. mg KOH/g | Average consumption L/h | Pump durability 1,000 h |
|---|---|---|---|---|---|---|---|
|  | BASF and 97.1699% n-butanol |  |  |  |  |  |  |

Surprisingly, based butanol mixtures and isobutanol with derivate cetane number about 35, therefore below specification suitable for diesel oil of about 42 showed good cold start and good performance of the power curve x torque. Also surprisingly, additive contents were relatively low, allowing the alternatives to be economical. The average consumption, in general, in the range of 15% higher than the diesel consumption, which was also surprising, once the ratio between the lower calorific values of butanol and diesel is about 1.32 (38.6 MEL/29.2 MJ/L). Lack of anti-corrosive water significant contents as well as metal surface of injector nozzle, can explain the low corrosion and great stability of the free acidity of mixture after periods of exposure to high temperature. Based on the research and tests conducted, an optimized formulation consisted of:

50 to 99% of fuel formed by one or more four carbon alcohol, such as n-butanol, isobutanol, sec-butanol and terc-butanol.

one or more additives capable of increasing the explosiveness of butanol, such as:

0.5% to 5% of Triethylene Glycol Dinitrate (TEGDN) or
0.5% to 5% of Tetraethylene Glycol Dinitrate (TetraEGDN) or
2% to 15% of nitrate of 2-ethyl hexanol (2-EHN) or
2% to 15% of tetrahydrofurfuryl nitrate (THFN); or
0.5% to 15% of polyethylene glycol dinitrate (PEGDN); or
2% to 15% of isoamyl nitrate (IAN), or
2% to 15% of isopropyl nitrate (IPN), or
2% to 15% of organic peroxides, or
2% to 15% of ethoxylated glycerin; or
2% to 15% of ethoxylated glycerin nitrate; or
10% to 60% of esters of fatty acids.

0.005% to 1.0% of one or more commercially available additives to increase lubricity or friction modifiers, such as carboxylic acids Kerokorr 99C and amine mixture and oleic acid Kerocom 3561, both of BASF AG; mixture to ethoxylated amine Ultrazol 9525 A and mixture based on carboxylic acid ester Ultrazol 9555, both of Lubrizol Corporation; mixtures based on carboxylic acid ester Tolad 9185 or Tolad 9165; mixtures based on carboxylic acids Tolad 9101 or Tolad 9113 and mixtures based on amide Tolad 9137 or 9141R Tolad, all of Baker Hughes Inc.; polyethylene glycol; polypropylene glycol; or other compounds having the same function commercially available.

0.0005 to 1.0% of a stabilizer additive (controller hydrolysis of nitrates) such as: ethanolamines, diphenylamine, diphenylureas (such as ethyl centralite), morpholine, or other compounds character poorly alkaline.

0.0005 to 1.0% one or more anti-corrosive additives that act by forming film adsorbed on metal surfaces are commercially available, such as polyether-based mixture Keropur MFLEX 3651, mixture based on acid amide KeroKorr carboxylic 3232, both of BASF AG; Tolad 3224 or Tolad 3222, both of Baker Hughes; or other compounds commercially available.

Other additives with known or alleged characteristics to modify the properties of butanol and its isomers alcohols as indicated herein may be used in the ranges indicated on it not limiting the inventive field of this application.

It will be readily recognized as an additional advantage, by a technician in the area of fuels, as fuel object of this application presents solubility in diesel fuel of conventional fossil fuels, fuel blends object of this application to diesel fuel can be made with effective results without prejudice the current teachings of this application.

What is claimed is:

1. A liquid fuel composition for ignition by compression, the liquid fuel composition comprising:
    50% to 97.5% of fuel formed by one or more four carbon alcohols;
    2.4% to 15% of one or more additives that increase explosiveness of a four carbon alcohol wherein of the one or more additives that increase explosiveness of a four carbon alcohol, the liquid fuel composition comprises 2.4% to 5% of at least one member selected from a group consisting of Triethylene Glycol Dinitrate (TEGDN) and Tetraethylene Glycol Dinitrate (TetraEGDN);
    0.005% to 1.0% of one or more additives that increase lubricity or modify friction;
    0.0005% to 1.0% of a stabilizer additive; and
    0.0005% to 1.0% of one or more anti-corrosive additives.

2. The liquid fuel composition according to claim 1 wherein the 50% to 97.5% of fuel formed by one or more four carbon alcohols comprises one or more four carbon alcohols selected from a group consisting of n-butanol, isobutanol, sec-butanol and terc-butanol.

3. The liquid fuel composition according to claim 1 wherein the 0.005% to 1.0% of one or more additives that increase lubricity or modify friction comprises at least one member selected from a group consisting of carboxylic acids and amine mixture and oleic acid, mixture to ethoxylated amine and mixture based on carboxylic acid ester, mixtures based on amide, polyethylene glycol, and polypropylene glycol.

4. The liquid fuel composition according to claim 1 wherein the 0.0005% to 1.0% of a stabilizer additive comprises at least one member selected from a group consisting of ethanolamines, diphenylamine, diphenylureas and morpholine.

5. The liquid fuel composition according to claim 1 wherein the 0.0005% to 1.0% of one or more anti-corrosive additives comprises at least one member selected from a group consisting of a polyether-based mixture and a mixture based on amide carboxylic acid.

6. The liquid fuel composition according to claim 1 wherein the one or more additives that increase explosiveness of a four carbon alcohol comprises at least one member selected from a group consisting of nitrate of 2-ethyl hexanol (2-EHN), tetrahydrofurfuryl nitrate (THFN) of isoamyl nitrate (IAN), isopropyl nitrate (IPN).

7. The liquid fuel composition according to claim 1 comprising polyethylene glycol dinitrate (PEGDN).

8. The liquid fuel composition according to claim 1 wherein the one or more additives that increase explosiveness of a four carbon alcohol comprises at least one member selected from a group consisting of an organic peroxide and ethoxylated glycerin.

9. The liquid fuel composition according to claim 1 wherein the one or more additives that increase explosiveness of a four carbon alcohol comprises ethoxylated glycerin nitrate.

10. The liquid fuel composition according to claim 1 comprising a composition for mixture with fossil diesel oil.

11. The liquid fuel composition according to claim 1 comprising a liquid fuel for injection into a diesel engine.

12. A liquid fuel composition for ignition by compression, the liquid fuel composition comprising:
  50% to 97.5% of fuel formed by one or more four carbon alcohols;
  2.4% to 5% of Triethylene Glycol Dinitrate (TEGDN);
  0.005% to 1.0% of one or more additives that increase lubricity or modify friction;
  0.0005% to 1.0% of a stabilizer additive; and
  0.0005% to 1.0% of one or more anti-corrosive additives.

13. The liquid fuel according to claim 12 wherein the one or more four carbon alcohols comprises n-butanol.

14. The liquid fuel according to claim 12 wherein the one or more four carbon alcohols comprises isobutanol.

15. The liquid fuel of claim 12 comprising an antioxidant additive that inhibits butyric acid odor formation in the liquid fuel.

* * * * *